(12) United States Patent
Östrup et al.

(10) Patent No.: US 8,874,112 B2
(45) Date of Patent: Oct. 28, 2014

(54) SERVICE DEPENDENT INACTIVITY TIMER

(75) Inventors: Peter Östrup, Linköping (SE); Henrik André-Jönsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 13/415,333

(22) Filed: Mar. 8, 2012

(65) Prior Publication Data

US 2012/0289232 A1 Nov. 15, 2012

Related U.S. Application Data

(60) Provisional application No. 61/484,034, filed on May 9, 2011.

(51) Int. Cl.
*H04W 36/00* (2009.01)
*H04W 76/06* (2009.01)

(52) U.S. Cl.
CPC ........ *H04W 76/068* (2013.01); *H04W 36/0083* (2013.01); *H04W 36/0016* (2013.01)
USPC ............................ 455/436; 455/437; 455/438

(58) Field of Classification Search
CPC .............. H04W 36/00; H04W 36/005; H04W 36/0011; H04W 36/0083; H04W 36/26; H04W 36/0016; H04W 76/068
USPC ........... 455/414.1, 414.2, 436, 437, 438, 439, 455/442, 450, 451, 452.2, 452.3; 370/329, 370/331, 335, 338, 328
See application file for complete search history.

(56) References Cited

U.S. PATENT DOCUMENTS

| 7,436,779 | B1 | 10/2008 | Mangal et al. |
| 2002/0172178 | A1 | 11/2002 | Suzuki et al. |
| 2007/0259673 | A1* | 11/2007 | Willars et al. ................. 455/453 |

FOREIGN PATENT DOCUMENTS

WO 03/061221 A1 7/2003

OTHER PUBLICATIONS

3GPP TSG-RAN WG2#67bis, Tdoc R2-096027, "Application of Fast Dormancy", Research in Motion UK Limited, Miyazaki, Japan, Oct. 12-16, 2009.
International Search Report and Written Opinion mailed Aug. 8, 2012 in PCT Application No. PCT/IB2012/051894.

* cited by examiner

*Primary Examiner* — Jean Gelin
(74) *Attorney, Agent, or Firm* — Nixon & Vanderhye, P.C.

(57) ABSTRACT

A node (20) of a communications network proposes an inactivity timer parameter for a radio access network bearer. The inactivity timer parameter indicates for how much time the bearer may be inactive for a session or a connection while the bearer is still allocated resources of the radio access network. The node proposes the inactivity timer parameter in dependence upon a service characteristic or a subscription characteristic for the session or the connection.

23 Claims, 8 Drawing Sheets

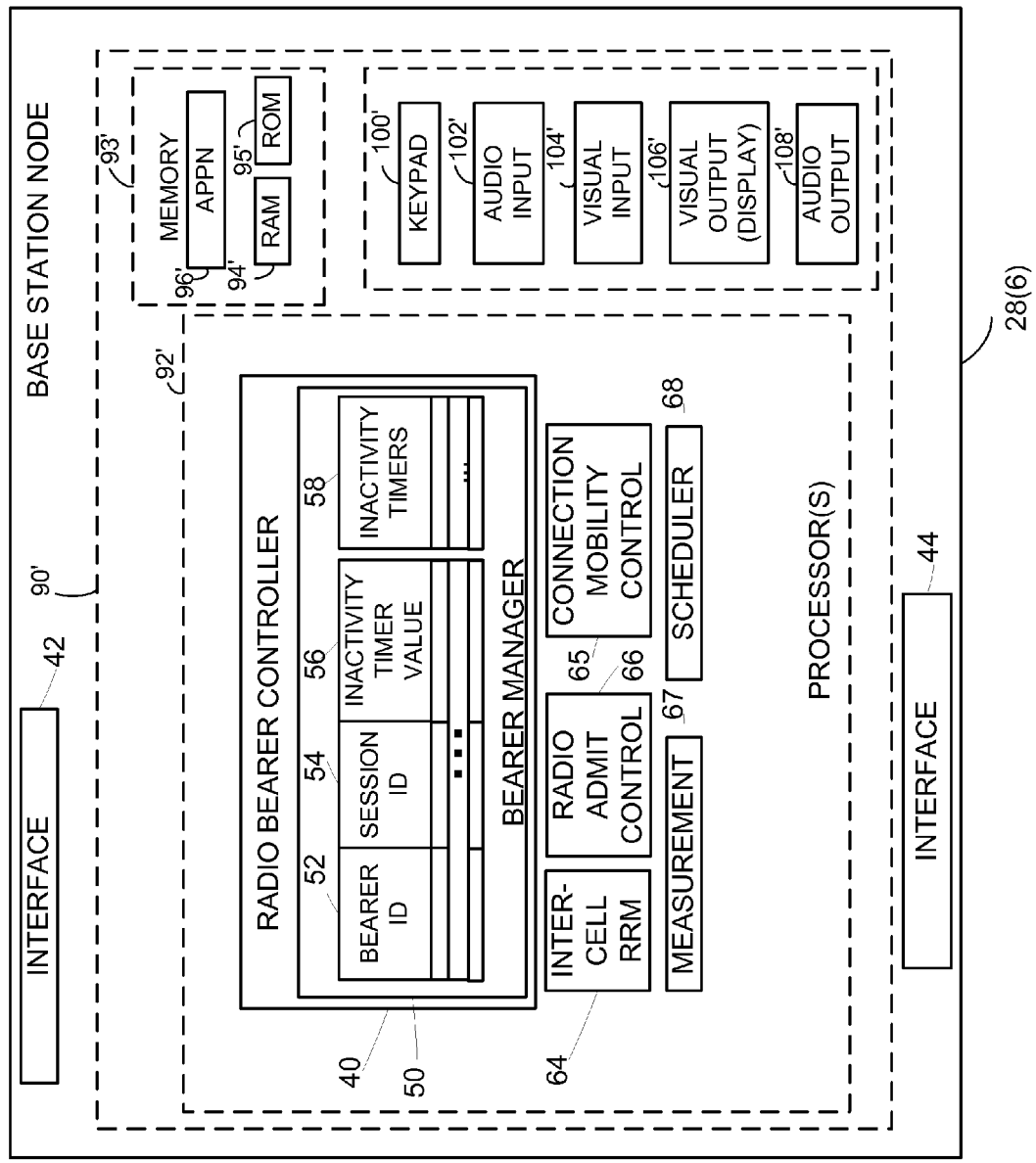

SERVICE DEPENDENT INACTIVITY TIMER

This application claims the priority and benefit of U.S. Provisional Patent Application 61/484,034, filed May 9, 2011, entitled "Service Dependent Inactivity Timer", which is incorporated herein by reference in its entirety.

TECHNICAL FIELD

This invention pertains to telecommunications, and particularly to provision of bearers in a radio access network.

BACKGROUND

In a typical cellular radio system, wireless terminals, also known as mobile stations and/or user equipment units (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

The Open Systems Interconnection model (OSI model) describes the functions of a communications system in terms of abstraction layers, with similar communication functions being grouped into logical layers. From top to bottom the layers are stacked this way: Application (Layer 7); Presentation (Layer 6); Session (Layer 5); Transport (Layer 4); Network (Layer 3); Data Link (Layer 2); and Physical (Layer 1).

Whenever a wireless terminal is being provided with a service, the service is associated with a radio bearer specifying the configuration for Layer-2 and Physical Layer (Layer-1) in order to have its quality of service clearly defined. Radio bearers are channels offered by Layer-2 to higher layers for the transfer of either user or control data.

When a bearer is established, a node of the radio access network determines for how long a time the bearer shall be allowed to be inactive and still hold or be allocated certain resources of the radio access network, e.g., of a base station, before the bearer is released. In other words, when not carrying data the bearer is allowed to remain in the RRC Connected Mode only for a prescribed inactivity time before the bearer is released. Typically a node such as a base station node keeps track of such inactivity time of a bearer by using an inactivity timer. In Long Term Evolution (LTE), for example, the inactivity timer is set internally in the base station node (eNb) for all bearers. That is, according to conventional practice the value of the inactivity timer is set to the same value for all user equipments, e.g., for all wireless terminals served by the node.

The choice of an inactivity timer value for a bearer has significant consequences. If the choice of inactivity timer value for a bearer is imprudent, such choice may result in misalignment between the inactivity timer setting and the service which utilizes the bearer.

For example, if the inactivity timer is given too low a value with regards to the needs of the service, the bearer will be prematurely released and thereafter it or another bearer will have to be re-established to maintain the service. Such prematurely released and re-establishment unfortunately increases the overhead signalling.

On the other hand, if the inactivity timer is given too high a value, resources will remain allocated to the bearer perhaps even long after the bearer is no longer carrying data for the service, thereby wastefully preventing other wireless terminals from using the bearer (and thus unwisely administering resources of the radio access network).

Studies regarding user behavior for interactive type services (e.g. web browsing) show that there is seldom new user activity after 60 seconds of inactivity for such services. Consequently, the inactivity timer is set to 61-64 seconds in most radio access network implementations.

However, the inventors believe that a uniform inactivity timer setting of about 61 seconds is not optimal for other types of services. For example, considering short message service (SMS), when an SMS is delivered to the UE relevant bearers are created to the UE and the SMS is delivered. Even if the SMS is delivered very quickly (less than a second) the bearers will remain until they time out. So for one way SMS delivery it might be preferable to have very a very short inactivity timer value. But if the user is supposed to answer the SMS, the connection must be kept alive until the response is completed. These same types of considerations are also valid for other kinds of IP traffic, e.g. MSN/Yahoo Messenger messages, applications that check for weather once every 30 minutes, etc.

Another area where uniform inactivity timer setting may be a problem is machine-to-machine communication where certain kinds of connections may require a client to send a burst of data followed by a potential acknowledgement. In such machine-to-machine communication the inactivity timer could have a very low value relative to web browsing services or the like.

Thus, a problem arises in that different types of services could require different type (e.g., different length) of inactivity timer settings for their respective bearers.

SUMMARY

Particular embodiments of the solutions described herein propose that the setting of the inactivity timer should not be uniform for all services and subscribers but instead depend upon a service characteristic or a subscription characteristic. For example, the setting of the inactivity timer after having delivered/received an SMS could or should be the time it takes for most end-users to create and send a reply (plus an optimal offset).

In one of its aspects the technology disclosed herein concerns a node of a communications network. The node comprises electronic circuitry configured to propose an inactivity timer parameter for a radio access network bearer. The inactivity timer parameter indicates for how much time the bearer may be inactive for a session or a connection while the bearer is still allocated resources of the radio access network. The electronic circuitry is configured to propose the inactivity timer parameter in dependence upon a service characteristic or a subscription characteristic for the session or the connection.

In an example embodiment the node is a core network node and the electronic circuitry further comprises a message generator configured to generate a message which includes the inactivity timer parameter.

In an example embodiment the radio access network comprises a Long Term Evolution (LTE) radio access network, and the message comprises an INITIAL CONTEXT SETUP REQUEST message or an E-RAB SETUP REQUEST message.

In an example embodiment the service characteristic is service type.

In an example embodiment the subscription characteristic is one of subscriber type and/or subscription type.

In an example embodiment the electronic circuitry is configured to propose the inactivity timer parameter in accordance with expected user behavior for the service or the connection. In an example implementation the electronic circuitry is configured to propose the inactivity timer parameter in accordance with an expected maximum inactivity time duration after which a user is not likely to remain active.

In another of its aspects the technology disclosed herein concerns a node of a radio access network communications network. The radio access network nodes comprises electronic circuitry configured to use a proposed inactivity timer parameter for establishing a radio access network bearer and for controlling allocation of the bearer in accordance with the proposed inactivity timer parameter. The inactivity timer parameter indicates for how much time the bearer may be inactive for a session or a connection while the bearer is still allocated resources of the radio access network. The inactivity timer parameter is dependent upon a service characteristic or a subscription characteristic for the session or connection.

In an example embodiment the radio access network comprises a Long Term Evolution (LTE) radio access network and the radio access network node comprises an interface over which the radio access network node receives the proposed inactivity timer parameter in a message from a core network node. In an example implementation of such embodiment the message comprises an INITIAL CONTEXT SETUP REQUEST message or an E-RAB SETUP REQUEST message.

In an example embodiment the radio access network node further comprises a handover unit configured to handover the session or connection over from the radio access network node to a target node. In an example implementation the radio access network comprises a Long Term Evolution (LTE) radio access network and the radio access network node comprises an interface over which the proposed inactivity timer parameter is transmitted at least eventually to the target node in a handover message. In such example embodiment the handover message comprises one of the following: S1-AP: HANDOVER REQUIRED message; S1-AP: HANDOVER REQUEST message; X2-AP: HANDOVER REQUEST message; and, any appropriate message that carries information between Mobility Management Entity (MME) nodes at an inter-MME S1 handover.

In an example embodiment the service characteristic is service type.

In an example embodiment the subscription characteristic is one of subscriber type and/or subscription type.

In an example embodiment the inactivity timer parameter is dependent upon expected user behavior for the service or connection. In an example implementation the inactivity timer parameter is dependent upon an expected maximum inactivity time duration after which a user is not likely to remain active.

In another of its aspects the technology disclosed herein concerns a method of operating a communications network. The method comprises generating a proposed inactivity timer parameter for a radio access network bearer; and using the proposed inactivity timer parameter for determining how much time the bearer may be inactive for a session or a connection while the bearer is still allocated resources of the radio access network. In accordance with the method the inactivity timer parameter is generated in dependence upon a service characteristic or subscription characteristic for a session or connection.

In an example embodiment and mode the method further comprises setting an expiration time of inactivity timer for the bearer in dependence on the proposed inactivity timer parameter; and then releasing the bearer after expiration of an inactivity timer.

In an example embodiment and mode the method further comprises generating a message which includes the proposed inactivity timer parameter at a core network node and transmitting the message to a radio base station node of a radio access network, and using the proposed inactivity timer parameter at the radio base station node for determining how much time the bearer may be inactive for the session or the connection while the bearer is still allocated resources of the radio access network.

In an example embodiment and mode the radio access network comprises a Long Term Evolution (LTE) radio access network, and the message comprises an INITIAL CONTEXT SETUP REQUEST message or an E-RAB SETUP REQUEST message.

In an example embodiment and mode the radio access network comprises a Long Term Evolution (LTE) radio access network, and the method further comprises transmitting the proposed inactivity timer parameter at least eventually to a target node in a handover message. The handover message comprises one of the following: S1-AP: HANDOVER REQUIRED message; S1-AP: HANDOVER REQUEST message; a X2-AP: HANDOVER REQUEST message; and, any appropriate message that carries information between Mobility Management Entity (MME) nodes at an inter-MME S1 handover.

In an example embodiment and mode the service characteristic is service type.

In an example embodiment and mode the subscription characteristic is one of subscriber type and/or subscription type.

In an example embodiment and mode, the method further comprises generating the proposed inactivity timer parameter in accordance with expected user behavior for the service or the connection. In an example implementation, the method further comprises generating the proposed inactivity timer parameter in accordance with an expected maximum inactivity time duration after which a user is not likely to remain active.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is a schematic view of an example embodiment of a radio access network node comprising a platform implementation.

DETAILED DESCRIPTION

Figure 1:
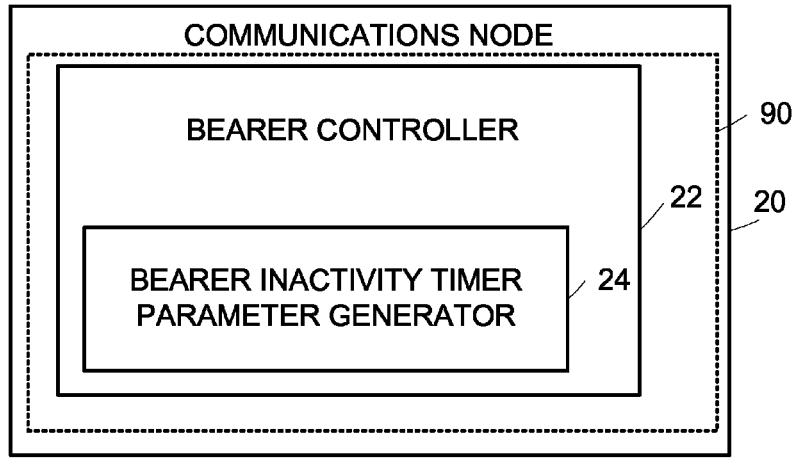
FIG. 1 is a diagrammatic view of an example node which at least proposes an inactivity timer parameter for a bearer.

In the following description, for purposes of explanation and not limitation, specific details are set forth such as particular architectures, interfaces, techniques, etc. in order to provide a thorough understanding of the present disclosure. However, it will be apparent to those skilled in the art that the present disclosure may be practiced in other embodiments that depart from these specific details. That is, those skilled in the art will be able to devise various arrangements which, although not explicitly described or shown herein, embody the principles of the present disclosure and are included within its spirit and scope. In some instances, detailed descriptions of well-known devices, circuits, and methods are omitted so as not to obscure the description of the present embodiments with unnecessary detail. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being hardware-implemented and/or computer-implemented, and thus machine-implemented.

In terms of hardware implementation, the functional blocks may include or encompass, without limitation, digital signal processor (DSP) hardware, reduced instruction set processor, hardware, e.g., digital or analog, circuitry including but not limited to application specific integrated circuit(s) (ASIC), and, where appropriate, state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows an example generic embodiment of a communications node 20 which comprises bearer controller 22. The bearer controller 22 controls bearers of a radio access network through which one or more wireless terminals communicate, e.g., through a core network over a session or connection to one or more services or applications. As shown in FIG. 1, the bearer controller 22 comprises bearer inactivity timer parameter generator 24. As explained herein, the bearer inactivity timer parameter generator 24 proposes an inactivity timer parameter for a radio access network bearer. The inactivity timer parameter indicates or determines, at least in part, for how much time the bearer may be inactive for a session or a connection while the bearer is still allocated resources of the radio access network. The bearer inactivity timer parameter generator 24 is configured to propose the inactivity timer parameter in dependence upon a service characteristic or a subscription characteristic for the session or the connection, and in an example embodiment may make such proposal individually for each session or connection.

The example node 20 of FIG. 1 is generic for several reasons. One such reason is that the node 20 may depict either a node of a core network or a node of the radio access network itself. For example, in an example embodiment node 20 may be a base station node of the radio access network. In the example embodiment in which node 20 is a base station node of the radio access network, the node 20 may not only propose the inactivity timer parameter for the radio access network bearer, but may also control allocation of the bearer in accordance with the proposed inactivity timer parameter. That is, as a base station node, the node 20 may actually set up the bearer and then release or tear down the bearer in accordance with the proposed inactivity timer parameter, e.g., upon expiration of an inactivity timer which was set by the node 20 in accordance with the proposed inactivity timer parameter.

Figure 2:
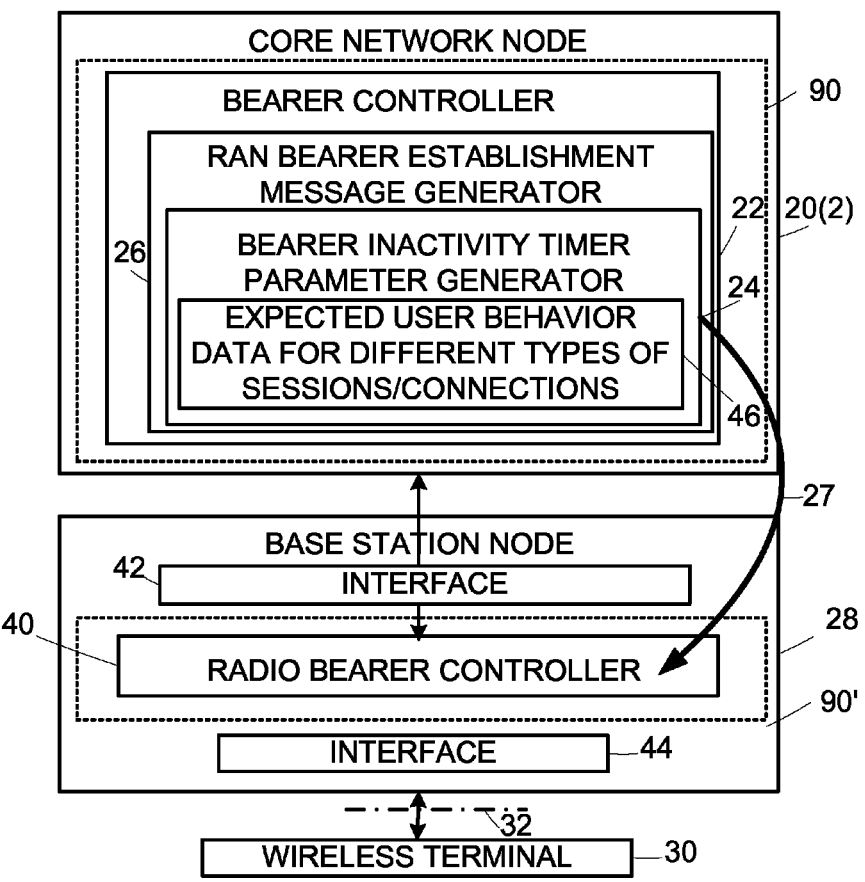
FIG. 2 is a diagrammatic view of a communications system comprising an example node which at least proposes an inactivity timer parameter together with an example node which uses a proposed inactivity timer parameter for controlling allocation of a bearer.

FIG. 2 illustrates a situation in which the node which comprises the bearer inactivity timer parameter generator 24 is a node of a core network, and thus depicted as node 20(2). In the FIG. 2 embodiment, the bearer controller 22 also comprises bearer establishment message generator 26. The bearer establishment message generator 26 is configured and serves to generate a message (such as message 27) to a node of the radio access network, such as base station node 28 of radio access network 29.

As further shown in FIG. 2, base station node 28 of the radio access network 29 communicates with one or more wireless terminals 30 over an air or radio interface 32. The base station node 28 comprises radio bearer controller 40, interface equipment 42 connected to the core network node 20(2); and interface equipment 44 over which base station node 28 communicates with wireless terminal 30. Radio bearer controller 40 of the base station node 28 of FIG. 2 uses the proposed inactivity timer parameter for establishing the radio access network bearer (received from node 20(2) through the interface equipment 42), and also controls allocation of the bearer in accordance with the proposed inactivity timer parameter.

As described herein, a proposed inactivity timer parameter may be expressed in several ways. For example, the proposed inactivity timer parameter may be an actual time duration (e.g., a time value with which a timer is initialized and from which the timer counts down). Alternatively, the proposed inactivity timer parameter may be an index or other descriptor which designates the time duration or from which the time duration may be derived.

The bearer controllers 22 of the embodiments described herein and encompassed hereby do not uniformly provide or propose same inactivity timer parameters for plural bearers of the radio access network. Rather, the bearer controllers 22 generate the proposed inactivity timer parameter based on specific and potentially variable criteria, e.g., in dependence upon a service characteristic or a subscription characteristic for the session or the connection.

As used herein, "service characteristic" means or comprises service type. For example, a first service type may be an interactive service in the form of web browsing or the like in which the time between user acts (e.g., user input) is typically quite short, e.g., on the order of about one minute (e.g., sixty seconds). A second service type may be in the form of a short message service (SMS), wherein the time between user acts may be longer than one minute, since it may take the user more time to compose or originate the input. Another or third service type may be a voice service, e.g., a voice call. The time between voice calls is probably quite long, so long that it is better to have a short inactivity timer setting to push the user out of the system quicker after a finished voice call. A "short" inactivity timer setting could be, for example, on the order of a few seconds.

As used herein, "subscription characteristic" means or comprises at least one of subscriber type and/or subscription type. The "subscriber type" may be an attribute or characteristic associated with a certain user of the wireless terminal 30, e.g., a characteristic which groups one or more subscribers according to their behavior or requirements. The "subscription type" may be an attribute or characteristic associated with an account linked to the wireless terminal 30, e.g., levels or a hierarchy of subscription status, such as (for example), "gold"/"silver" and "bronze" subscriptions where the operator can give different priorities to the different subscribers. Any type of subscription is a governmental type subscription, e.g., a subscription for a chief of police or fire chief, for example. If the chief is given a very long inactivity timer (e.g., on the order of hours), the chief will have less accessibility issues.

To facilitate assignment of an appropriate proposed inactivity timer parameter for a particular bearer, the bearer inactivity timer parameter generator 22 may comprise or have stored therein expected user behavior data 46. The expected user behavior data 46 has stored therein, or otherwise accesses, information for differing types of sessions or connections, or for differing types of subscribers and/or subscriptions. For example, if a bearer for web browsing is requested to be set up for a session involving the wireless terminal 30, the bearer inactivity timer parameter generator 24 may access the expected user behavior data 46 in order to obtain information for setting a relative short value for the proposed inactivity timer parameter for the web browsing service involved in the session. Or, if a bearer for an SMS service is requested, the bearer inactivity timer parameter generator 24 may access the expected user behavior data 46 in order to obtain information for setting a relative long value for the proposed inactivity timer parameter for the SMS service. Thus, by consulting the expected user behavior data 46 the bearer inactivity timer parameter generator 24 may, in an example embodiment, propose the inactivity timer parameter in accordance with an expected maximum inactivity time duration after which a user is not likely to remain active.

Figure 3:
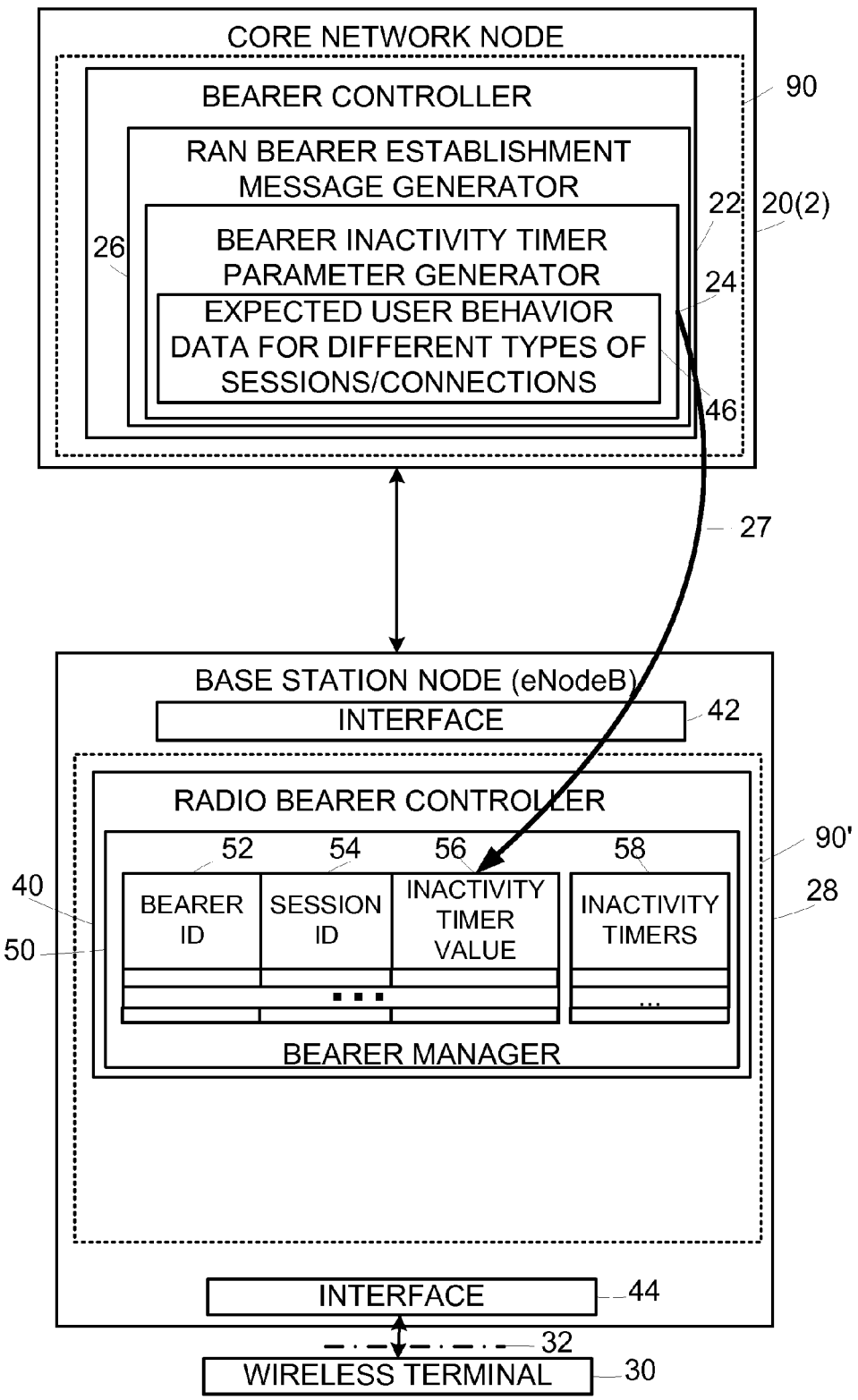
FIG. 3 is a diagrammatic view showing in more detail certain example aspects of the communications system of FIG. 2.

FIG. 3 shows in more detail certain example aspects of radio bearer controller 40, and particularly shows radio bearer controller 40 as comprising radio bearer manager 50. For each radio bearer established or setup by radio bearer controller 40, the radio bearer manager 50 keeps track of such information as an identifier for the bearer (bearer ID 52); a session or connection identifier 54 for which the bearer is allocated; and an inactivity timer value 56 associated with the bearer. To this end, FIG. 3 shows the bearer ID 52, session or connection identifier 54, and inactivity timer value 56 for each allocated radio bearer (depicted by each row of the table of FIG. 3 except for the first or caption row) as being maintained or stored in a table format, such as in a memory. The captions of the table being bearer ID 52, session or connection identifier 54, and inactivity timer value 56. FIG. 3 further shows the radio bearer manager 50 as comprising an inactivity timer 58 for each allocated radio bearer. As shown by arrow 59 in FIG. 3, at an appropriate time each inactivity timer 58 is loaded with an appropriate initializing value, e.g., an expiration time value for the respective inactivity timer 58 as obtained from inactivity timer value 56 of radio bearer manager 50.

The expiration time value with which each inactivity timer 58 is initialized is said to be dependent, at least in part, on the proposed inactivity timer parameter. The proposed inactivity timer parameter may be received from node 20(2), and from bearer controller 22 in particular, in a message such as message 27. In the FIG. 2 and other embodiments "being dependent at least in part" encompasses a scenario in which the proposed inactivity timer parameter as received from node 20 is itself used as the expiration time value which is loaded into or otherwise used by the respective inactivity timer 58. "Being dependent at least in part" encompasses other scenarios in which the proposed inactivity timer parameter as received from node 20 is input to a function or algorithm or modified in accordance with a rule or expression, predetermined or otherwise, which results in the particular expiration time value which is to be loaded into the inactivity timer 58.

Figure 4:
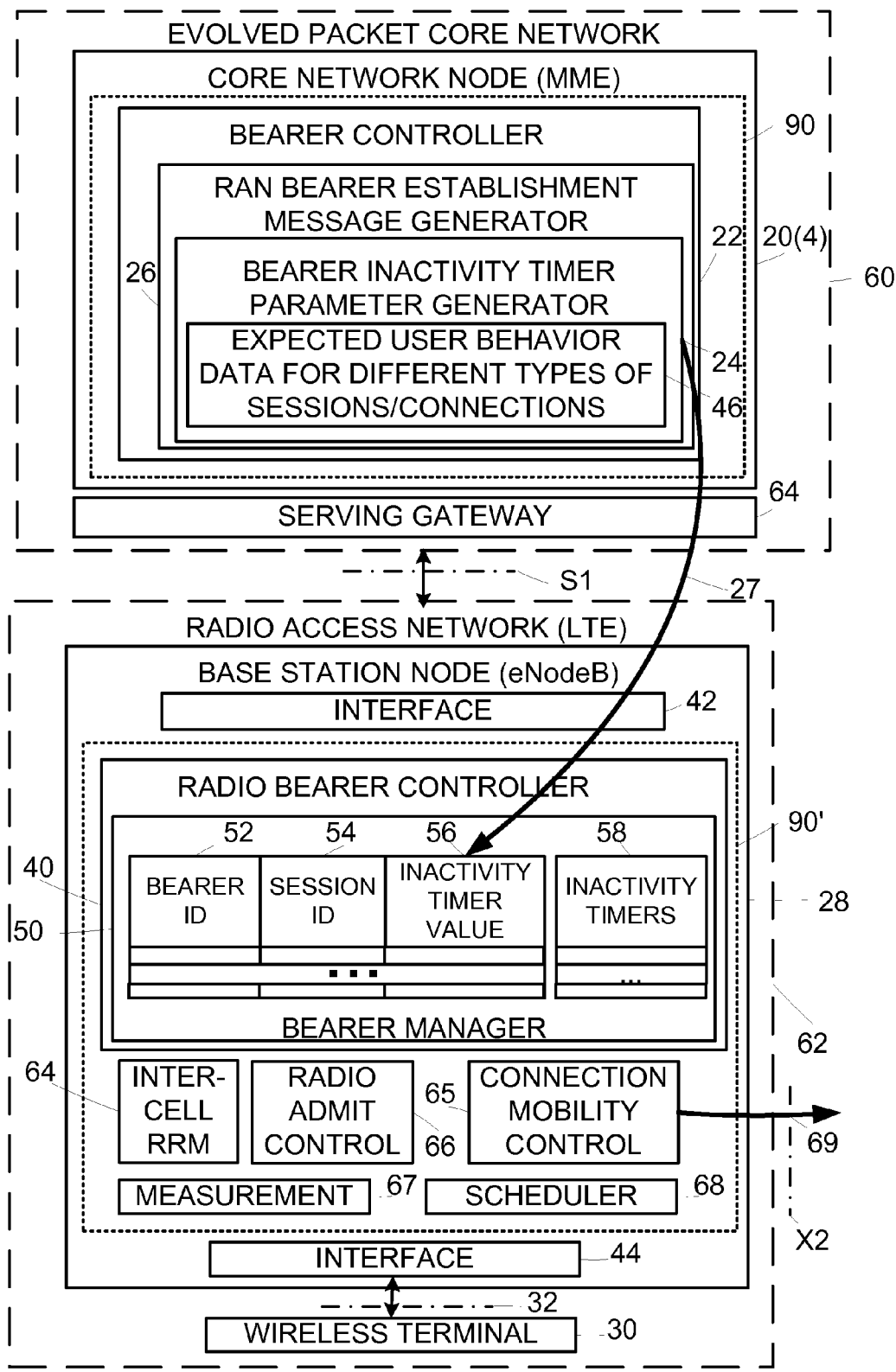
FIG. 4 is a diagrammatic view of a communications system an example node which at least proposes an inactivity timer parameter together with an example node of a Long Term Evolution (LTE) radio access network (RAN) which uses a proposed inactivity timer parameter for controlling allocation of a bearer.

FIG. 4 illustrates an implementation of the FIG. 2 embodiment in which the core network node is a node of Evolved Packet Core network 60 and the base station node is an eNodeB or eNB of Long Term Evolution (LTE) radio access network 62. In the FIG. 4 example embodiment, the node which includes bearer controller 22 is a Mobility Management Entity (MME), and is depicted as node 20(4). As understood by the person skilled in the art, Evolved Packet Core network 60 further comprises serving gateway 64 through which the MME node 20(4) communicates with the Long Term Evolution (LTE) radio access network 62, and eNodeB 28 in particular, over an interface known as the S1 interface.

FIG. 4 also illustrates selected other functionalities of eNodeB 28 in addition to interface equipments 42 and 44 and radio bearer controller 40. Such other functionalities, understood by the person skilled in the art, comprise inter-cell radio resource management 64; connection mobility control (handover unit) 65; radio admission control 66; eNB measurement configuration and provision 67; and dynamic resource allocation (scheduler) 68.

As shown in FIG. 4, the eNodeB 28 may be connected to other base station nodes, e.g., other eNodeBs, over an interface known as the X1 interface. As mentioned above, the connection mobility control 56 serves as a handover unit which, when necessary or desired, handovers the session or connection over from the eNodeB 28 to a target node, e.g., to another base station.

Structure and operation of various aspects of Evolved Packet Core network 60 and Long Term Evolution (LTE) radio access network 62 are understood with reference to 3GPP TS 36.300 V10.4.0 (2011-06), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), which is incorporated herein by reference in its entirety.

In an example embodiment such as that of FIG. 4 in which the radio access network comprises a Long Term Evolution (LTE) radio access network, the message 27 which carries the proposed inactivity timer parameter may be, for example, an INITIAL CONTEXT SETUP REQUEST message or an E-RAB SETUP REQUEST message. Whereas the INITIAL CONTEXT SETUP REQUEST message carries the proposed inactivity timer parameter to the node in conjunction with setup of the bearer, the E-RAB SETUP REQUEST message reflects the fact that the inactivity timer parameter may be modified after a bearer has been setup.

Moreover, the proposed inactivity timer parameter may be transmitted to the target node in a handover message. In the LTE embodiment, the handover message comprises one of the following: S1-AP: HANDOVER REQUIRED message; S1-AP: HANDOVER REQUEST message; X2-AP: HANDOVER REQUEST message; and, any appropriate message that carries information between Mobility Management Entity (MME) nodes at an inter-MME S1 handover. FIG. 4 depicts by arrow 69 an example situation in which the inactivity timer parameter is transmitted in a handover that occurs over the X1 interface. It will be understood that in other (unillustrated) situations the inactivity timer parameter is transmitted in a handover that occurs over the S1 interface.

Figure 5:
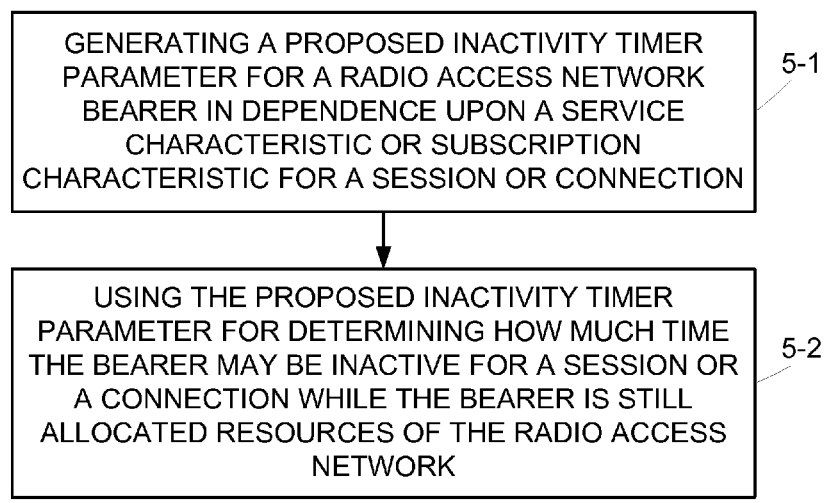
FIG. 5 is a flowchart showing example basic acts or steps included in an example method of operating a communications network wherein inactivity timer parameter are proposed in dependence upon a service characteristic or a subscription characteristic for the session or the connection.

FIG. 5 shows example basic acts or steps included in an example method of operating a communications network. Act 5-1 comprises generating a proposed inactivity timer parameter for a radio access network bearer in dependence upon a service characteristic or subscription characteristic for a session or connection. Act 5-2 comprises using the proposed inactivity timer parameter for determining how much time the bearer may be inactive for a session or a connection while the bearer is still allocated resources of the radio access network.

Figure 5A:
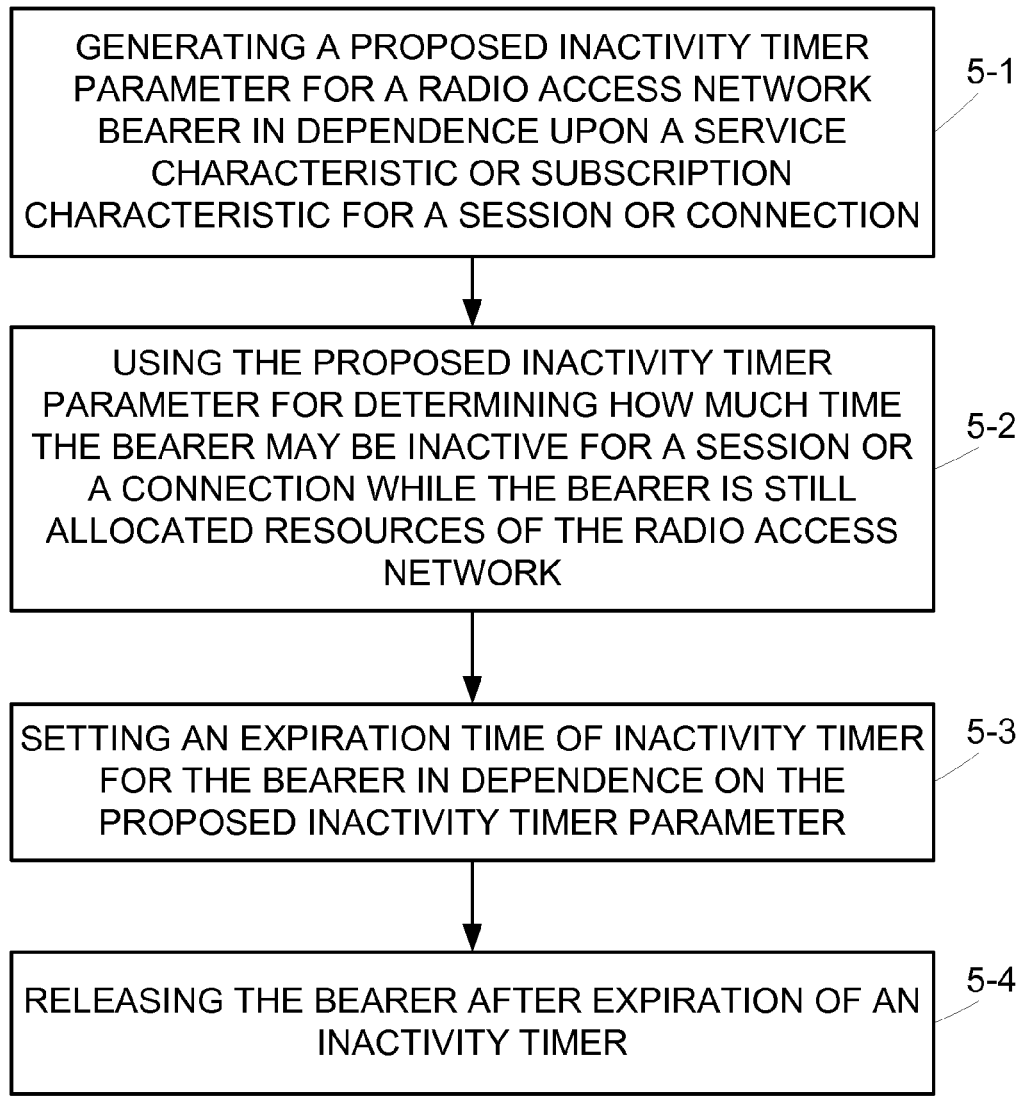
FIG. 5A is a flowchart showing an example implementation of the basic embodiment and mode of FIG. 5.

FIG. 5A shows an example implementation of the basic embodiment and mode of FIG. 5 as further comprising act 5-3 and act 5-4. Act 5-3 comprises setting an expiration time of the inactivity timer for the bearer in dependence on the proposed inactivity timer parameter; act 5-4 comprises releasing the bearer after expiration of an inactivity timer.

Figure 5B:
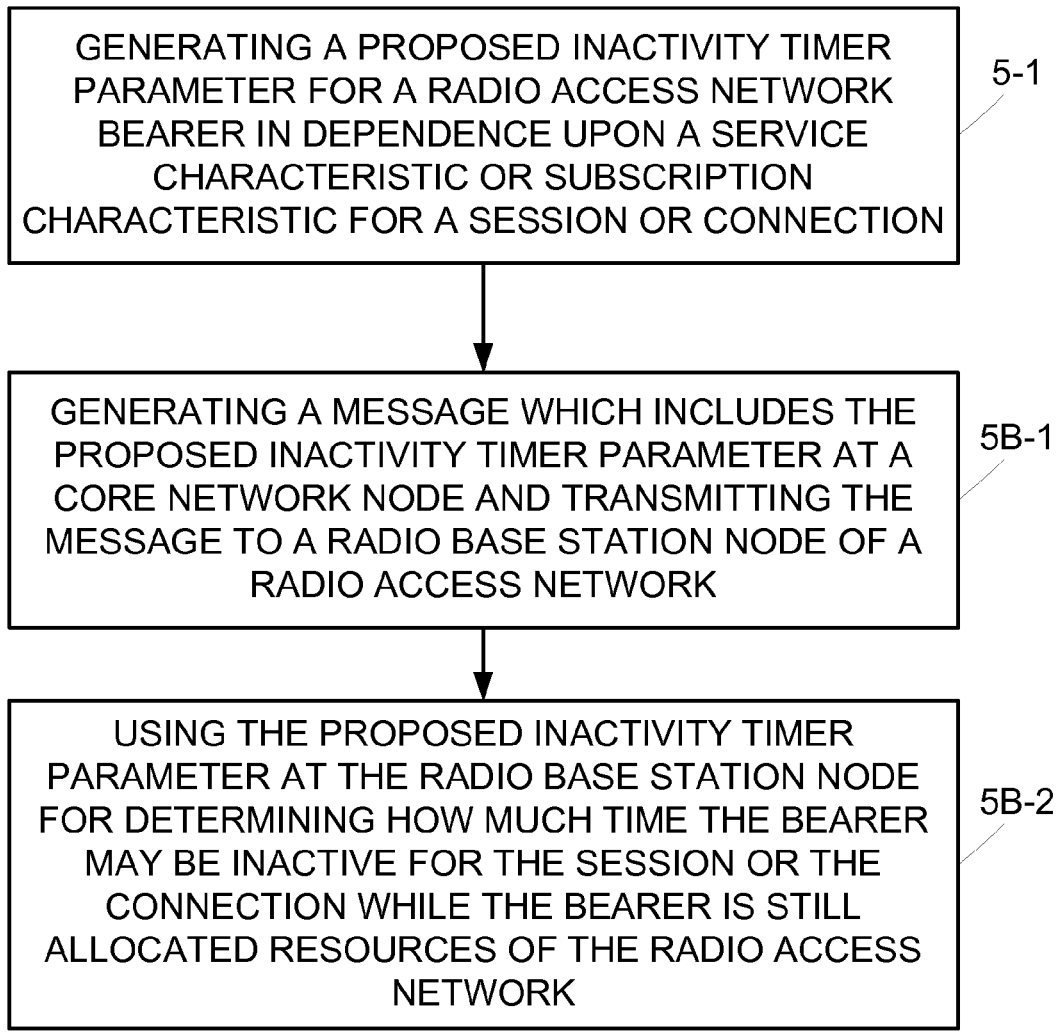
FIG. 5B is a flowchart showing another example implementation of the basic embodiment and mode of FIG. 5.

FIG. 5B shows another example implementation of the basic embodiment and mode of FIG. 5 as further comprising act 5B-1 and act 5B-2. Act 5B-1 comprises generating a message which includes the proposed inactivity timer parameter at a core network node and transmitting the message to a radio base station node of a radio access network. Act 5B-2 comprises using the proposed inactivity timer parameter at the radio base station node for determining how much time the bearer may be inactive for the session or the connection while the bearer is still allocated resources of the radio access network.

In example embodiments, functionalities of the nodes described herein may be realized using electronic circuitry.

Figure 6:
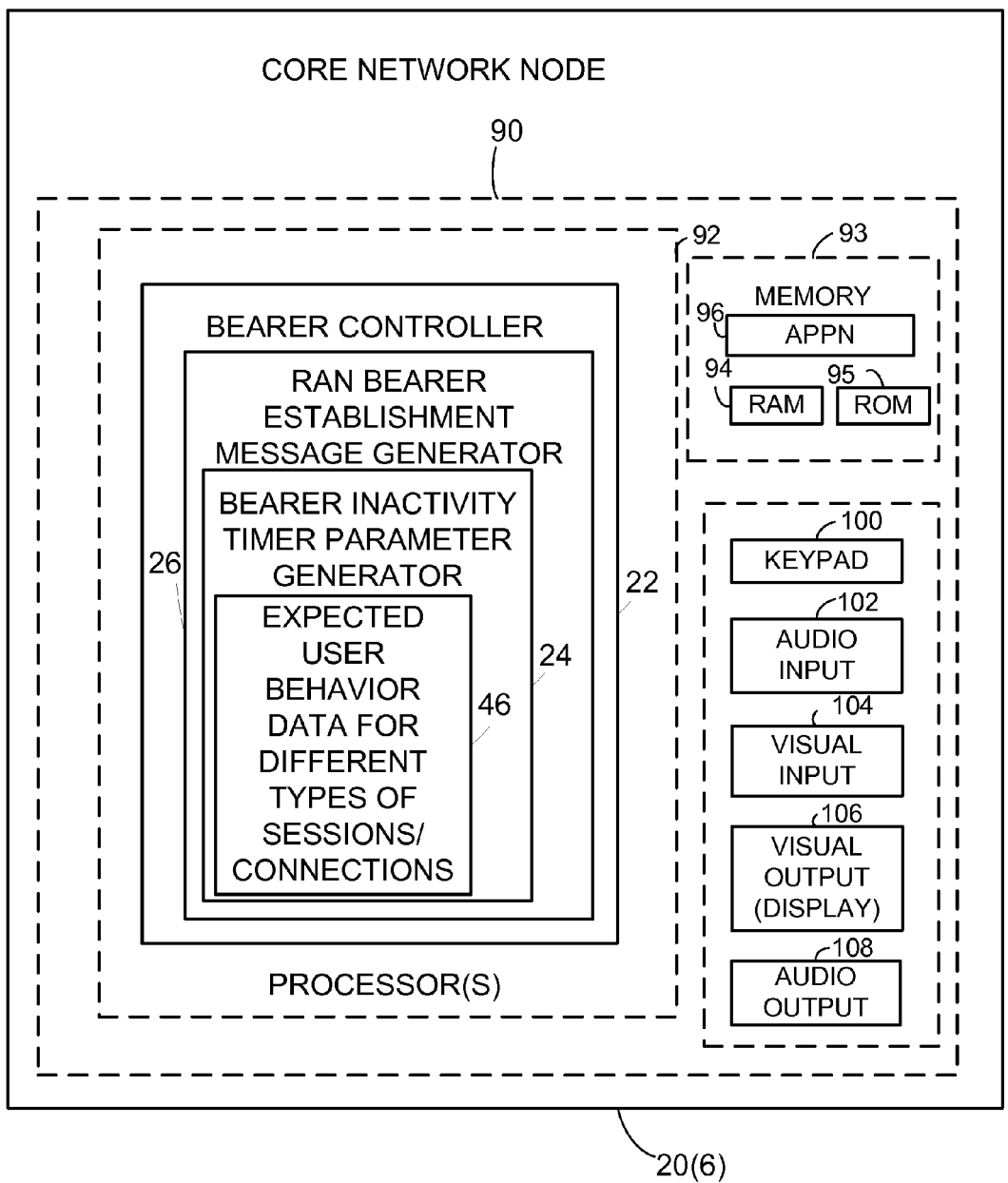
FIG. 6 is a schematic view of an example embodiment of a core network node comprising a platform implementation.

For example, FIG. 6 shows an embodiment of a node 20(6) which at least proposes an inactivity timer parameter for a bearer. The bearer controller 22 of the node 20(6) is realized by electronic circuitry and particularly by platform 90, the platform 90 being framed by broken lines in FIG. 6. The terminology "platform" is a way of describing how the functional units of the node 20(6) can be implemented or realized by machine including electronic circuitry. One example platform 90 is a computer implementation wherein one or more of the framed elements including bearer controller 22 are realized by one or more processors 92 which execute coded instructions and which use non-transitory signals in order to perform the various acts described herein. In such a computer implementation the fixed wireless terminal 29 and its controller 40 can comprise, in addition to a processor(s), memory section 93, which in turn can comprise random access memory 94; read only memory 95; application memory 96; and any other memory such as cache memory, for example. The memory section 93, e.g., the application memory 96 may store, e.g., coded instructions which can be executed by the processor to perform acts described herein.

Typically the platform 90 of node 20(6) also comprises other input/output units or functionalities, some of which are illustrated in FIG. 16, such as keypad 100; audio input device 102, e.g., microphone; visual input device 104, e.g., camera; visual output device 106; and audio output device 108, e.g., a speaker. Other types of input/output devices can also be connected to or comprise node 20(6).

In the example of FIG. 6 the platform 90 has been illustrated as computer-implemented or computer-based platforms. Another example platform suitable for the packet core network entity in particular is that of a hardware circuit, e.g., an application specific integrated circuit (ASIC) wherein circuit elements are structured and operated to perform the various acts described herein.

FIG. 7 similarly shows how a node 29(6) of a radio access network can be implemented or realized by a machine platform, e.g., by electronic circuitry in the form of a computer and/or hardware circuitry. Primed reference numerals in FIG. 7 are understood from their unprimed corresponding reference numerals in FIG. 6.

While platforms 90 and 90' have been illustrated in FIG. 6 and FIG. 7, respectively, it should be understood that all embodiments herein are susceptible to at least optional implementation by machine platform, e.g., electronic circuitry, as depicted by broken lines labeled as 90 or 90' in various figures.

As used herein, a "mobile wireless terminal" can be a mobile station or user equipment unit (UE) such as a mobile telephone or "cellular" telephone or a laptop with wireless capability, e.g., mobile termination, and thus can be, for example, a portable, pocket, hand-held, computer-included, or car-mounted mobile device which communicates voice and/or data via a radio access network. Moreover, a wireless terminal can be a fixed terminal which communicates voice and/or data via a radio access network.

Thus, in some example embodiments and modes of the technology disclosed herein, in the core network, the type of service, the type of subscriber and/or the type of subscription is considered from an inactivity timer point of view when setting up a certain bearer in the radio access network. In some example embodiments and modes the inactivity timer of a certain bearer is added to the messages, in the core network protocols (S1-AP in LTE), used for establishing bearers in the radio access network. In particular, in LTE embodiments the following S1-AP messages are affected: INITIAL CONTEXT SETUP REQUEST and E-RAB SETUP REQUEST.

As mentioned above, the inactivity timer setting may also be transferred to other nodes during handover. This transfer may affect the following (LTE) protocols: S1-AP: HANDOVER REQUIRED; S1-AP: HANDOVER REQUEST; and/or X2-AP: HANDOVER REQUEST.

In example embodiments and modes the radio access network may use the received inactivity timer, for each established bearer, to decide for how long a certain bearer may be inactive before the core network is asked to release the bearer.

Advantageously, the technology disclosed herein makes it possible to adapt the inactivity timer to an optimal setting on service/subscriber/subscription level leading to a better utilization of RAN and network signalling resources. The technology disclosed herein allows the operator to determine, on a service level, an optimal setting of the inactivity timer. This improves utilization of radio access network (RAN) resources at the same time as it minimizes the need for network signaling.

Although the description above contains many specificities, these should not be construed as limiting the scope of the technology disclosed herein but as merely providing illustrations of some of the presently preferred embodiments of the disclosed technology. Thus the scope of this technology disclosed herein should be determined by the appended claims and their legal equivalents. Therefore, it will be appreciated that the scope of the technology disclosed herein fully encompasses other embodiments, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A node of a communications network comprising:
an electronic circuitry configured to propose an inactivity timer parameter for a radio access network bearer, the inactivity timer parameter indicating for how much time the radio access network bearer is allowed to be inactive for a session or a connection while the radio access network bearer is still allocated resources of a radio access network,
wherein the electronic circuitry is configured to propose the inactivity timer parameter in dependence upon a service characteristic or a subscription characteristic for the session or the connection,
wherein the node is a core network node, and
wherein the proposed inactivity timer generator is used to establish the radio access network bearer in the radio access network.

2. The node of claim 1, wherein the electronic circuitry further comprises a message generator configured to generate a message which includes the inactivity timer parameter.

3. The node of claim 2,
wherein the radio access network comprises a Long Term Evolution (LTE) radio access network, and
wherein the message comprises an INITIAL CONTEXT SETUP REQUEST message or an E-RAB SETUP REQUEST message.

4. The node of claim 1, wherein the service characteristic is a service type.

5. The node of claim 1, wherein the subscription characteristic is one of a subscriber type and/or a subscription type.

6. The node of claim 1, wherein the electronic circuitry is configured to propose the inactivity timer parameter in accordance with an expected user behavior for the service or the connection.

7. The node of claim 6, wherein the electronic circuitry is configured to propose the inactivity timer parameter in accordance with an expected maximum inactivity time duration after which a user is not likely to remain active.

8. A node of a radio access network communications network comprising:
an electronic circuitry configured to
use a proposed inactivity timer parameter, received from a core network node, for establishing a radio access network bearer, and
control an allocation of the radio access network bearer in accordance with the proposed inactivity timer parameter,
wherein the inactivity timer parameter indicates for how much time the radio access network bearer is allowed to be inactive for a session or a connection while the radio access network bearer is still allocated resources of the radio access network, and wherein the inactivity timer parameter is dependent upon a service characteristic or a subscription characteristic for the session or connection.

9. The node of claim 8,
wherein the radio access network comprises a Long Term Evolution (LTE) radio access network and the radio access network node comprises an interface over which the radio access network node receives the proposed inactivity timer parameter in a message from the core network node, and
wherein the message comprises an INITIAL CONTEXT SETUP REQUEST message or an E-RAB SETUP REQUEST message.

10. The node of claim 8, further comprising
a handover unit configured to handover the session or the connection over from the radio access network node to a target node,
wherein the radio access network comprises a Long Term Evolution (LTE) radio access network and the radio access network node comprises an interface over which the proposed inactivity timer parameter is transmitted at least eventually to the target node in a handover message, and
wherein the handover message comprises one of the following:
a S1-AP: HANDOVER REQUIRED message;
a S1-AP: HANDOVER REQUEST message; and
a X2-AP: HANDOVER REQUEST message.

11. The node of claim 8, wherein the service characteristic is a service type.

12. The node of claim 8, wherein the subscription characteristic is one of a subscriber type and/or a subscription type.

13. The node of claim 8, wherein the inactivity timer parameter is dependent upon an expected user behavior for the service or connection.

14. The node of claim 8, wherein the inactivity timer parameter is dependent upon an expected maximum inactivity time duration after which a user is not likely to remain active.

15. A method of operating a communications network, the method comprising:
generating at a core network node a proposed inactivity timer parameter for a radio access network bearer, the inactivity timer parameter being generated in dependence upon a service characteristic or subscription characteristic for a session or a connection; and
using the proposed inactivity timer parameter at a radio base station node of a radio access network to establish the radio access network bearer, the proposed inactivity timer parameter being for determining how much time the radio access network bearer is allowed to be inactive for the session or the connection while the radio access network bearer is still allocated resources of the radio access network.

16. The method of claim 15, further comprising:
setting an expiration time of an inactivity timer for the radio access network bearer in dependence on the proposed inactivity timer parameter; and
releasing the radio access network bearer after an expiration of the inactivity timer.

17. The method of claim 15, further comprising:
generating a message which includes the proposed inactivity timer parameter at the core network node and transmitting the message to the radio base station node of the radio access network,
wherein the act of using the proposed inactivity timer parameter at the radio base station node to establish the radio access network bearer is performed in response to the message.

18. The method of claim 17,
wherein the radio access network comprises a Long Term Evolution (LTE) radio access network, and
wherein the message comprises an INITIAL CONTEXT SETUP REQUEST message or an E-RAB SETUP REQUEST message.

19. The method of claim 15, wherein the radio access network comprises a Long Term Evolution (LTE) radio access network, the method further comprising:
transmitting from the radio base station node the proposed inactivity timer parameter at least eventually to a target node in a handover message,
wherein the handover message comprises one of the following:
a S1-AP: HANDOVER REQUIRED message;
a S1-AP: HANDOVER REQUEST message; and
a X2-AP: HANDOVER REQUEST message.

20. The method of claim 15, wherein the service characteristic is a service type.

21. The method of claim 15, wherein the subscription characteristic is one of a subscriber type and/or a subscription type.

22. The method of claim 15, further comprising generating the proposed inactivity timer parameter in accordance with an expected user behavior for the service or the connection.

23. The method of claim 22, further comprising generating the proposed inactivity timer parameter in accordance with an expected maximum inactivity time duration after which a user is not likely to remain active.

* * * * *

UNITED STATES PATENT AND TRADEMARK OFFICE
CERTIFICATE OF CORRECTION

PATENT NO. : 8,874,112 B2
APPLICATION NO. : 13/415333
DATED : October 28, 2014
INVENTOR(S) : Östrup et al.

Page 1 of 1

It is certified that error appears in the above-identified patent and that said Letters Patent is hereby corrected as shown below:

IN THE SPECIFICATION

In Column 8, Line 23, delete "generator 22" and insert -- generator 24 --, therefor.

In Column 9, Line 38, delete "control 56" and insert -- control 65 --, therefor.

Signed and Sealed this
Fifth Day of July, 2016

Michelle K. Lee
*Director of the United States Patent and Trademark Office*